US012725752B2

(12) United States Patent
Sakamoto

(10) Patent No.: US 12,725,752 B2
(45) Date of Patent: Sep. 1, 2026

(54) POWER SUPPLY DEVICE FOR GYROTRON AND POWER CONTROL METHOD

(71) Applicant: Kyoto Fusioneering Ltd., Uji (JP)

(72) Inventor: Keishi Sakamoto, Uji (JP)

(73) Assignee: Kyoto Fusioneering Ltd., Uji (JP)

( * ) Notice: Subject to any disclaimer, the term of this patent is extended or adjusted under 35 U.S.C. 154(b) by 15 days.

(21) Appl. No.: 19/089,007

(22) Filed: Mar. 25, 2025

(65) Prior Publication Data

US 2025/0226169 A1 Jul. 10, 2025

Related U.S. Application Data

(63) Continuation of application No. PCT/JP2023/034908, filed on Sep. 26, 2023.

(30) Foreign Application Priority Data

Sep. 30, 2022 (JP) ................................ 2022-158058

(51) Int. Cl.
*H01J 23/20* (2006.01)
*H01J 25/02* (2006.01)

(52) U.S. Cl.
CPC ............ *H01J 23/20* (2013.01); *H01J 25/025* (2013.01)

(58) Field of Classification Search
CPC .......... H01J 23/34; H01J 25/00; H01J 25/025; H01J 23/20; H01J 23/24; H01J 1/316; H01J 1/304; H01J 2201/3165; H01J 31/127; H01J 1/30; H01J 2329/00; H01J 9/027; H01J 9/025; H01J 1/312; H01J 2201/30469; H01J 2201/306; H01J 2237/006; H01J 2237/182; H01J 2237/2002; H01J 2237/2006; H01J 2237/24585; H01J 2237/2803; H01J 2237/2813; H01J 29/864; H01J 37/20; H01J 2237/3321; H01J 37/32449; H01J 63/06; H01J 9/242; H01J 1/20; H01J 1/24; H01J 1/32; H01J 17/063; H01J 2201/32; H01J 2329/8625; H01J 2329/864; H01J 2329/8645; H01J 2329/8655; H01J 29/028; H01J 3/022; H01J 31/12; H01J 31/123;
(Continued)

(56) References Cited

U.S. PATENT DOCUMENTS

2014/0097747 A1 4/2014 Bader

FOREIGN PATENT DOCUMENTS

JP H05-13015 A 1/1993
JP H06-76748 A 3/1994
(Continued)

OTHER PUBLICATIONS

International Search Report for PCT/JP2023/034908 dated Nov. 14, 2023.
PCT written opinion dated Nov. 14, 2023.

*Primary Examiner* — Monica C King
(74) *Attorney, Agent, or Firm* — Yokoi & Co., U.S.A.; Toshiyuki Yokoi

(57) ABSTRACT

A main power supply 51 supplies power to a main voltage circuit 5 applying a voltage to an electron gun unit 2*a* and a collector unit 26, a body power supply 31 supplies power to a body voltage circuit 3 applying a voltage to a body unit 25 and the collector unit 26, and a body power supply stabilization circuit 33 maintains an input/output voltage varying between an electron gun side supply line 51*b* of the main power supply 51 in the main voltage circuit 5 and a body side supply line 31*b* of the body power supply 31 in the body voltage circuit 3 at a predetermined output voltage.

8 Claims, 4 Drawing Sheets

(58) Field of Classification Search
CPC ............... H01J 31/125; H01J 37/32055; H01J 37/32174; H01J 37/32357; H01J 37/3244; H01J 37/32862; H01J 37/32935; H01J 61/06; H01J 61/33; H01J 65/044; H01J 9/022; H01J 1/14; H01J 1/15; H01J 1/3044; H01J 11/10; H01J 11/34; H01J 2201/30446; H01J 2201/30457; H01J 2209/385; H01J 2235/164; H01J 2237/0206; H01J 2237/047; H01J 2237/0473; H01J 2237/0475; H01J 2237/0812; H01J 2237/082; H01J 2237/3323; H01J 2329/8635; H01J 2329/866; H01J 27/205; H01J 29/467; H01J 29/92; H01J 29/96; H01J 3/021; H01J 35/04; H01J 35/064; H01J 35/32; H01J 37/08; H01J 37/12; H01J 37/24; H01J 37/3171; H01J 37/3174; H01J 37/32018; H01J 37/32082; H01J 37/32183; H01J 37/32192; H01J 37/32201; H01J 37/32431; H01J 37/32532; H01J 37/32541; H01J 37/32669; H01J 37/32706; H01J 37/32724; H01J 37/32816; H01J 37/32899; H01J 37/32963; H01J 37/32972; H01J 37/3405; H01J 37/3438; H01J 41/18; H01J 49/167; H01J 61/125; H01J 61/26; H01J 61/307; H01J 61/363; H01J 61/548; H01J 61/84; H01J 9/02; H01J 9/185; H01J 9/40
See application file for complete search history.

(56) References Cited

FOREIGN PATENT DOCUMENTS

| | | | |
|---|---|---|---|
| JP | H11-67112 | A | 3/1999 |
| JP | H11-162366 | A | 6/1999 |
| JP | 2003-317639 | A | 11/2003 |

POWER SUPPLY DEVICE FOR GYROTRON AND POWER CONTROL METHOD

CROSS-REFERENCE TO RELATED APPLICATIONS

This application claims the benefit of priority and is a Continuation application of the prior International Patent Application No. PCT/JP2023/034908, with an international filing date of Sep. 26, 2023, which designated the United States, and is related to the Japanese Patent Application 2022-158058, filed Sep. 30, 2022, the entire disclosures of all applications are expressly incorporated by reference in their entirety herein.

TECHNICAL FIELD

The present invention relates to a power supply device and a power control method for a gyrotron that generates a high-power electromagnetic wave in a millimeter wave band for heating plasma or the like in a nuclear fusion reactor.

BACKGROUND OF THE INVENTION

A gyrotron is used as a high-power radio-frequency generation source, for example, in an electron cyclotron resonance heating device for nuclear fusion plasma heating. A conventional gyrotron generates an electron beam by an electron gun in the gyrotron, emits the electron beam to a cavity to oscillate a high power radio frequency (RF), and outputs the high power radio frequency to the outside through an output window.

Here, the energy of the electron beam is accelerated by, for example, a voltage difference generated by a voltage of a main power supply (Main PS) and a voltage difference between the main power supply and a body power supply (Body PS). This main power supply is a power supply that drives the gyrotron and is a DC power supply that applies a voltage to a collector unit and the electron gun, and the body power supply is an acceleration power supply applied between a body unit and the collector unit.

The cathode electrode is heated by the main power supply to emit thermal electrons to form an electron beam, and the electron beam is incident on the resonator to cause a resonance action with an electric field in the resonator to generate RF, and the RF is converted from a waveguide mode such as TEm,n oscillated in the resonator to a spatial beam mode suitable for transmission and is output to the outside of the gyrotron via a reflecting mirror and the output window.

Incidentally, the main power supply (Main PS) of the gyrotron is a high power supply at a level of 50 A, and a voltage variation of several % usually occurs. FIG. 4 illustrates beam voltage dependency of the gyrotron output. As can be seen from the drawing, since the oscillation efficiency of the gyrotron greatly depends on the stability of the voltage such that the output variation at a level of 200 kW can occur with respect to the voltage variation of +/−0.5%, high voltage stability is required. In order to ensure the stability of the power supply voltage, conventionally, for example, a power supply device disclosed in Patent Literature 1 has been proposed.

In the power supply device disclosed in Patent Literature 1, the output voltages of the collector power supply, the anode power supply, and the body power supply are individually detected, a constant voltage control unit that constantly and separately holds the output voltages of the collector power supply, the anode power supply, and the body power supply based on the detected output voltages is provided, and the output voltage reference value of the collector power supply is converted into a reference value pattern stored in advance and output. Thereby, when the output voltage of the collector power supply varies at the time of starting or stopping the output voltage, the body power supply does not become overcurrent, and a smooth and stable output operation can be obtained.

PRIOR ART

Patent Documents

Patent Literature 1: JP 11-162366 A

SUMMARY OF THE INVENTION

Problem to be Solved by the Invention

In the power supply device disclosed in Patent Literature 1 described above, in order to stabilize the power supply, since it is assumed that the voltage of each unit is measured, feedback control of the voltages of the main power supply, the anode power supply, and the body power supply is performed in order to obtain a smooth and stable output, and active control is performed so as not to generate overcurrent, complex and highly accurate control is required for continuous output, expensive control means and complex control are required for this purpose, and there is a possibility that manufacturing cost and operation cost of a facility increase.

Therefore, the present invention has been made in view of such circumstances, and an object thereof is to provide a power supply device and a power control method for a gyrotron capable of improving the oscillation efficiency of the gyrotron while suppressing manufacturing cost and operation cost of a facility in the gyrotron.

Means for Solving the Problems

In order to solve the above problems, a power supply device for a gyrotron of the present invention is a power control device for a gyrotron, the gyrotron including:

- an anode electrode constituting an electron gun unit generating an electron beam;
- a body unit including a cavity resonator oscillating a high power radio frequency by an interaction with the electron beam generated by the anode electrode; and
- a collector unit capturing the electron beam after the interaction, the power control device including:

- a main power supply supplying power to a main voltage circuit applying a voltage to the electron gun unit and the collector unit;
- a body power supply supplying power to a body voltage circuit applying a voltage between the body unit and the collector unit;
- a body power supply stabilization circuit maintaining an input/output voltage varying between an electron gun side supply line of the main power supply in the main voltage circuit and a body side supply line of the body power supply in the body voltage circuit at a predetermined output voltage; and
- a body power supply resistance means connected between the body power supply and a connection point between the body power supply stabilization circuit and the body side supply line.

A power control method for a gyrotron of the present invention includes:

a power supplying step of supplying, by a main power supply, power to a main voltage circuit applying a voltage to the electron gun unit and the collector unit and supplying, by a body power supply, power to a body voltage circuit applying a voltage between the body unit and the collector unit;

a power supply stabilizing step of maintaining, by a body power supply stabilization circuit, an input/output voltage varying between an electron gun side supply line of the main power supply in the main voltage circuit and a body side supply line of the body power supply in the body voltage circuit at a predetermined output voltage; and a power supply rectifying step of adjusting, by a body power supply resistance means, a voltage between the body power supply and a connection point between the body power supply stabilization circuit and the body side supply line.

In the above invention, it is preferable to further include:

an anode power supply supplying power to an anode voltage circuit applying a voltage between an anode electrode and the collector unit;

an anode power supply stabilization circuit maintaining an input/output voltage varying between the electron gun side supply line of the main power supply in the main voltage circuit and the anode side supply line of the body power supply in the anode voltage circuit at a predetermined output voltage; and an anode power supply resistance means connected between the anode power supply and a connection point between the anode power supply stabilization circuit and the anode side supply line.

In the above invention, it is preferable that each power supply stabilization circuit includes, for example, a linear regulator circuit adjusting an input voltage to a predetermined output voltage by a voltage drop of a control element. Each power supply stabilization circuit can include, for example, a low-loss constant voltage control circuit that linearly adjusts an input voltage to a predetermined output voltage by a variable resistor whose resistance value is adjusted according to a feedback voltage of an output voltage, such as a linear regulator circuit including a Zener diode and a transistor. Note that this linear regulator circuit may be used singly, or may be used as a stack in which a plurality of linear regulator circuits are arranged.

Effects of the Invention

According to the present invention, in the power supply device of the gyrotron, since the power supply stabilization circuit supplying a stable voltage to the power supply circuit and the resistance means are used, a stable gyrotron power supply can be configured at a very low cost. Specifically, a body power supply stabilization circuit 33 is disposed between an electron gun side supply line 51*b* of a main power supply 51 and a body side supply line 31*b* of a body power supply 31. A body power supply resistor 32 is disposed between the body power supply 31 and a connection point 34 between the body power supply stabilization circuit 33 and the body side supply line 31*b*.

Thereby, when a voltage difference between the electron gun side supply line 51*b* of the main power supply 51 and the body side supply line 31*b* of the body power supply 31 is small, the voltage is amplified to a predetermined voltage, and when an overvoltage is applied, the voltage is absorbed, and a predetermined output can be maintained. Thereby, the input/output voltage varying between the electron gun side supply line 51*b* and the body side supply line 31*b* can be maintained at a predetermined output voltage, and the beam voltage is kept constant, so that extremely stable high-efficiency oscillation can be expected.

As a result, according to the present invention, in a gyrotron, it is possible to further stabilize a voltage applied to a power supply accelerating an electron beam and a power supply necessary for oscillation while suppressing manufacturing cost and operation cost of a facility, and to improve the oscillation efficiency of the gyrotron. As a result of improving the oscillation efficiency, downsizing of the collector and downsizing of the power supply and the cooling system can be promoted, and the generated X-rays can also be greatly reduced.

DETAILED DESCRIPTION OF THE INVENTION

First Embodiment

Hereinafter, a first embodiment of a power supply device for a gyrotron according to the present invention will be described in detail with reference to the accompanying drawings. Note that the embodiment described below exemplifies a device and the like for embodying the technical idea of this invention, and the technical idea of this invention does not specify the material, shape, structure, arrangement, and the like of each component as follows. Various modifications can be made to the technical idea of this invention within the scope of the claims.

(Configuration of Gyrotron)

Figure 1:
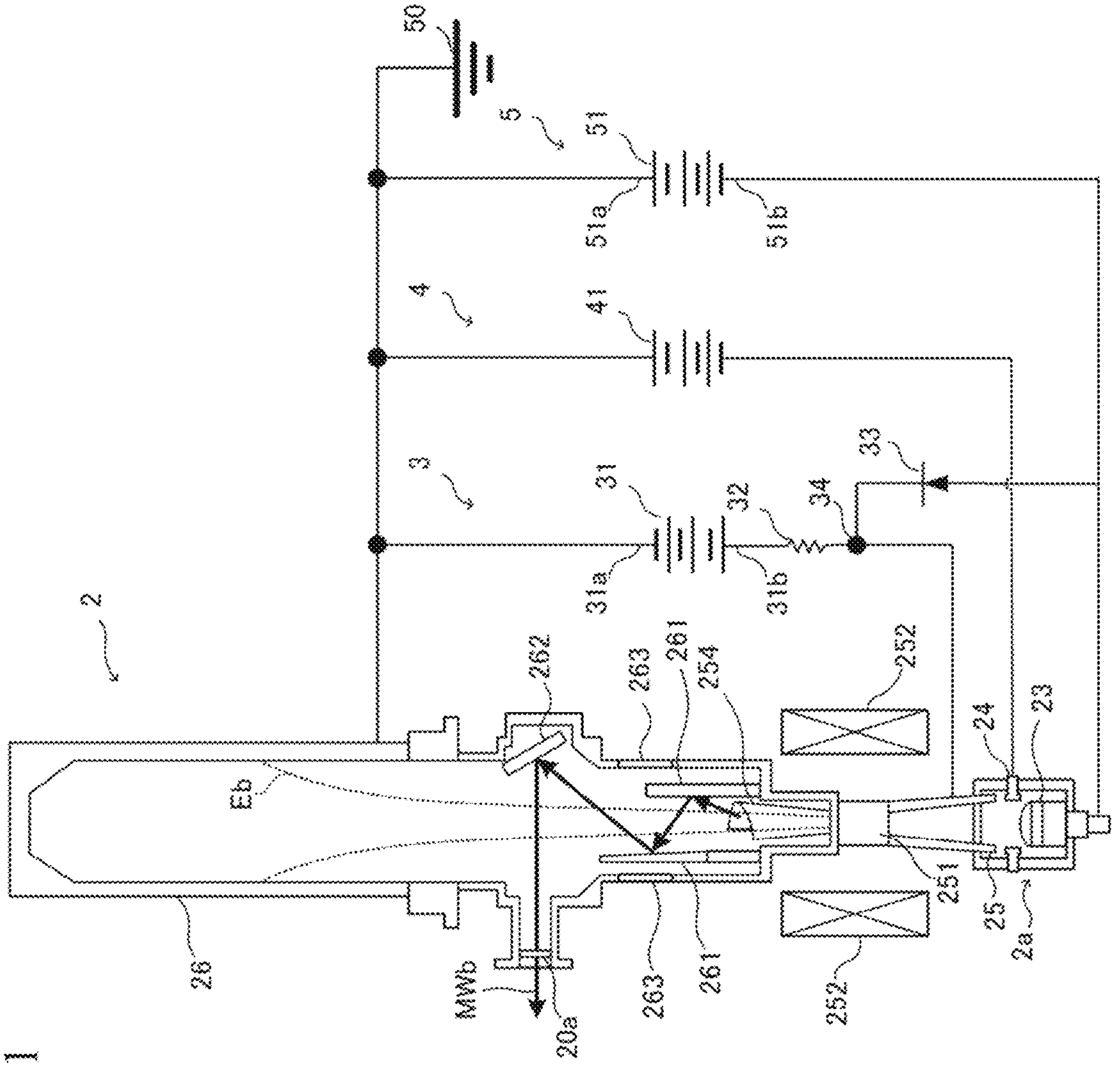
FIG. 1 is a circuit diagram illustrating a configuration of a power supply device (triode type) for a gyrotron according to a first embodiment.

First, a configuration of a gyrotron 2 to be subjected to power supply control according to the present invention will be described. FIG. 1 illustrates a schematic configuration of a power control device for the gyrotron 2. The gyrotron 2 is a high-power microwave generation device, and includes a triode electron gun unit 2*a* generating an electron beam, and a cathode electrode 23 and an anode electrode 24 are included in the electron gun unit 2*a*. The gyrotron 2 is roughly configured by a body unit 25 including a cavity resonator 251 that oscillates a high power radio frequency by an interaction with the electron beam generated from the electron gun unit 2*a*, and a collector unit 26 capturing the electron beam after the interaction.

An electron emission unit of the cathode electrode 23 is heated by a main power supply 51, thermal electrons are emitted by applying an electric field to form an electron beam, and the electron beam travels along the lines of magnetic force while being swirled by the magnetic field formed by a solenoid coil 252 and is incident on the cavity resonator 251. Here, the magnetic field generated by the solenoid coil 252 is adjusted to be maximum in the cavity resonator 251, but since the rotation ratio (rotational speed/linear velocity) of the swirling electron according to the magnetic field intensity, the swirling kinetic energy of the electrons is maximum in the cavity resonator.

When the electron beam having the increased swirling kinetic energy passes through the inside of the cavity resonator 251, the electron beam causes a resonance action with the electric field in the cavity resonator 251, and the swirling kinetic energy decelerated by the electric field is converted into an electromagnetic wave. This electromagnetic wave is converted into a predetermined mode and a normal electromagnetic beam mode by a mode converter 254 connected to the cavity resonator 251, and is sent to a nuclear fusion reactor via a mirror 261 and an output window 20*a*. The electron beam having completed the energy conversion is decelerated by a potential difference between the body unit 25 and the collector unit 26 applied by the body power supply 31, and then absorbed by the collector unit 26.

To describe each unit in detail, the body unit 25 is provided at the tip of the electron gun unit 2*a*, has a body electrode that applies an acceleration voltage, is surrounded by the solenoid coil (main coil) 252, and a static magnetic field is applied in the axial direction of the gyrotron 2. When a voltage is applied to the electron gun unit 2*a*, thermoelectrons are extracted. Here, the electron emission unit of the cathode electrode 23 in the gyrotron 2 has a narrow ring shape, and a cylindrical electron beam is formed. When electrons are extracted from the electron emission unit of the cathode electrode 23, if a finite angle is provided between the extraction direction of electrons and the magnetic field line direction of the static magnetic field, a rotational speed is given to the extracted electrons. When the coordination in which the acceleration electric field and the magnetic field intensity change along the trajectory of the electron is provided, a rotational speed is effectively given to the electron. The electrons emitted from here are wound around the static magnetic field and introduced into the downstream cavity resonator 251 along the lines of magnetic force.

The cavity resonator 251 is disposed at the center of the solenoid coil 252 that is a magnetic field generation device. Since the intensity of the magnetic field increases from the electron gun unit 2*a* toward the cavity resonator 251, the traveling energy of the electrons is converted into the rotational energy by the law of conservation of magnetic moment of electrons, and the ratio of the rotational speed to the traveling speed of the electrons, that is, a so-called rotation ratio (pitch factor) increases as the electrons travel, and an electron beam having a large rotational energy component can be generated in the cavity resonator 251.

The gyrotron 2 is an electron tube that converts rotational energy of electrons into energy of electromagnetic waves (microwaves) by the effect of an electron cyclotron resonance maser in the cavity resonator 251, and generates an electron beam with a high rotation ratio. In the electron gun unit 2*a* including the cathode electrode 23 and the anode electrode 24 for applying the extraction electric field, the rotation ratio can be controlled by controlling the anode voltage while keeping the energy of the electron beam constant. The rotation ratio also changes by changing the magnetic field of the electron gun unit 2*a*, but in this case, since the position of the electron beam changes, the electron beam is interlocked with the magnetic field (hereinafter, a cavity magnetic field) of the cavity resonator 251 and is aligned with the optimum electron beam position in the cavity resonator 251.

Inside the cavity resonator 251, an electromagnetic wave of a resonance mode having an inherent resonance frequency is excited according to the position of the electron beam and the applied magnetic field intensity. Since the electromagnetic wave is cut on the side of the electron gun unit 2*a*, the electromagnetic wave does not leak and propagates only to the downstream side. The electromagnetic wave is converted into a quasi-optical electromagnetic beam MWb by the mode converter 254, guided by reflection mirrors 241 and 242, and emitted to the outside via the output window 20*a*. An electron beam Eb that has lost energy after being used for electromagnetic wave generation in the cavity resonator 251 advances along the magnetic field and is captured by the collector unit 26.

In the gyrotron 2 having such a configuration, the electron beam emitted from the cathode electrode 23 performs a helical motion by the electric field formed by the anode electrode 24 and the magnetic field formed by the solenoid coil 252, and is further accelerated by the electric field between the cathode electrode 23 and the body unit 25. The energy of the accelerated electron beam is converted into rotational energy by the magnetic field formed by the solenoid coil 252. The electron beam having a helical motion thus obtained interacts in the cavity resonator 251 of the body unit 25, and a part of the energy of the electron beam is converted into high frequency energy. The electron beam having finished the interaction is captured by the collector unit 26.

(Configuration of Power Supply Device for Gyrotron)

The gyrotron 2 according to the present embodiment described above includes a power control device 1 for a gyrotron as illustrated in FIG. 1. As described above, the gyrotron 2 according to the present embodiment is roughly configured by the triode electron gun unit 2*a* including the cathode electrode 23 and the anode electrode 24, the body unit 25 including the cavity resonator 251, and the collector unit 26.

The power control device 1 for a gyrotron includes a main voltage circuit 5, a body voltage circuit 3, and an anode voltage circuit 4 as circuits of a power supply system connected to the gyrotron 2 to be loaded. The main voltage circuit 5 is a main power supply circuit that applies a voltage to the electron gun unit 2*a* and the collector unit 26, and is powered by the main power supply 51.

The anode voltage circuit 4 is a power supply circuit that applies a voltage between the anode electrode 24 and the collector unit 26, here, is powered by an anode power supply 41, and applies a voltage to the anode electrode 24 with the collector unit 26 as a reference potential (0 V).

The body voltage circuit 3 is a power supply circuit that applies a voltage between the body unit 25 and the collector unit 26, and is a power supply circuit that applies a voltage to the body unit 25 with the collector unit 26 as a reference potential, here, is powered by the body power supply 31, and applies a voltage to the body unit 25 with the collector unit 26 as a reference potential (0 V). Note that collector side supply lines 31*a*, 41*a*, and 51*a* of the power supplies 31,41, and 51 are connected to a ground 50, and the collector unit 26 is set to have a reference potential (0 V).

A body power supply stabilization circuit 33 maintaining an input/output voltage varying between an electron gun side supply line 51*b* of the main power supply 51 in the main voltage circuit 5 and a body side supply line 31*b* of the body power supply 31 in the body voltage circuit 3 at a predetermined output voltage is disposed. A body power supply resistor 32 connected between the body power supply 31 and a connection point 34 between the body power supply stabilization circuit 33 and the body side supply line 31*b* is disposed.

In the present embodiment, the body power supply stabilization circuit 33 includes, for example, a linear regulator circuit such as a series regulator or a shunt regulator that adjusts an input voltage to a predetermined output voltage by a voltage drop of a control element such as a bipolar transistor or a MOSFET. Here, as illustrated in FIG. 1, the body power supply resistor 32 is inserted into the body voltage circuit 3, and the body power supply stabilization circuit 33 is inserted between the body voltage circuit 3 and the electron gun side supply line 51*b* of the main voltage circuit 5.

Note that this power supply stabilization circuit may include, for example, a low-loss constant voltage control circuit that linearly adjusts an input voltage to a predetermined output voltage by a variable resistor whose resistance value is adjusted according to a feedback voltage of an output voltage, such as a linear regulator circuit including a Zener diode and a transistor. Note that this linear regulator circuit may be used singly, or can be used as a stack in which a plurality of linear regulator circuits are arranged, and when the voltage by the body power supply 31 is set to, for example, 30 kV and the linear regulator circuit is set to, for example, 80 kV, a current flows from the linear regulator circuit of the body power supply stabilization circuit 33 to the body power supply resistor 32 when the main power supply 51 exceeds 50 kV.

(Operation and Effect)

Figure 4:
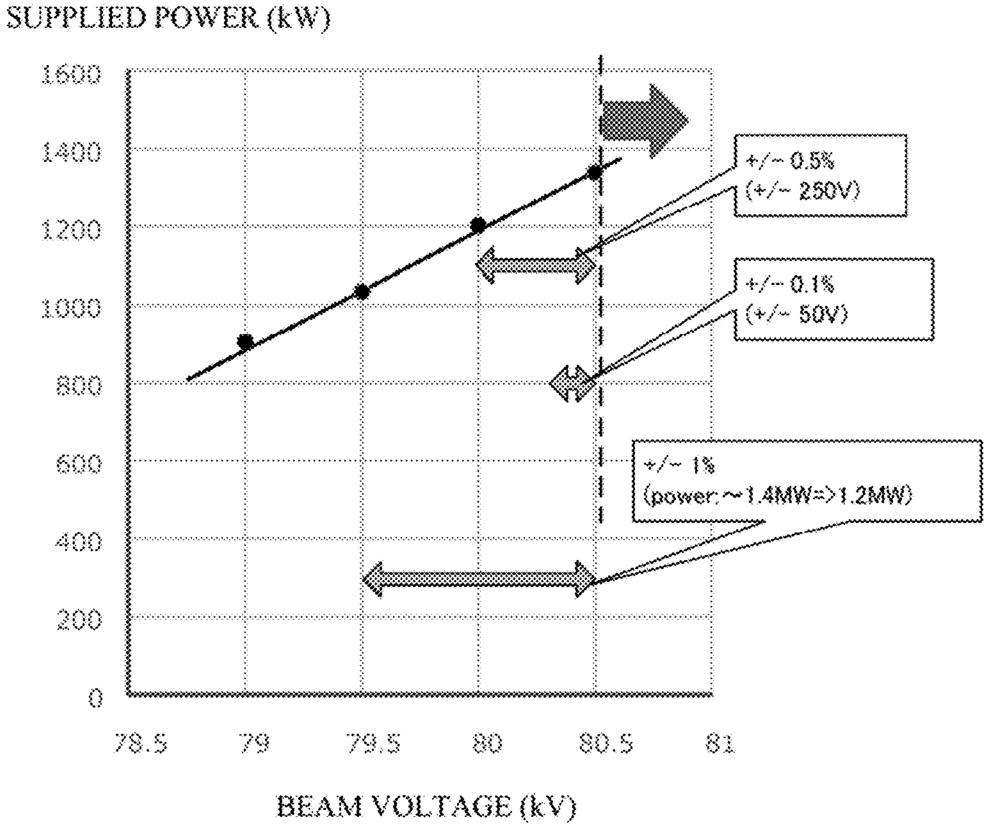
FIG. 4 is a graph showing a relationship between power and a beam voltage according to an embodiment.

According to the power supply device and control method for a gyrotron according to the present embodiment described above, the body power supply stabilization circuit 33 was disposed between the electron gun side supply line 51*b* of the main power supply 51 and the body side supply line 31*b* of the body power supply 31, and the body power supply resistor 32 was disposed between the body power supply 31 and the connection point 34 between the body power supply stabilization circuit 33 and the body side supply line 31*b*. Thereby, as illustrated in FIG. 4, even when the voltage difference between the electron gun side supply line 51*b* of the main power supply 51 and the body side supply line 31*b* of the body power supply 31 is small or an overvoltage is applied, a predetermined output can be maintained.

Thereby, the input/output voltage varying between the electron gun side supply line 51*b* and the body side supply line 31*b* can be maintained at a predetermined output voltage. In particular, since the body power supply stabilization circuit 33 according to the present embodiment is, for example, a linear regulator circuit such as a series regulator or a shunt regulator that adjusts an input voltage to a predetermined output voltage by a voltage drop of a control element such as a bipolar transistor or a MOSFET, when the main power supply 51 exceeds a predetermined voltage, a current flows from the body power supply stabilization circuit 33 to the body power supply resistor 32, the beam voltage is kept constant, and extremely stable high-efficiency oscillation can be expected.

At this time, the voltage variation of the main power supply 51 can be absorbed by the flow voltage generated in the body power supply resistor 32, and the energy recovery voltage is reduced by this voltage, but since the oscillation efficiency is greatly improved, a great improvement in the overall efficiency can be expected. Note that a user-friendly power supply system can be constructed by making the setting voltage of the linear regulator circuit remote.

As a result, according to the present embodiment, in a gyrotron, it is possible to further stabilize a voltage applied to a power supply accelerating an electron beam and a power supply necessary for oscillation while suppressing manufacturing cost and operation cost of a facility, and to improve the oscillation efficiency of the gyrotron. As a result of improving the oscillation efficiency, downsizing of the collector and downsizing of the power supply and the cooling system can be promoted.

Second Embodiment

Figure 2:
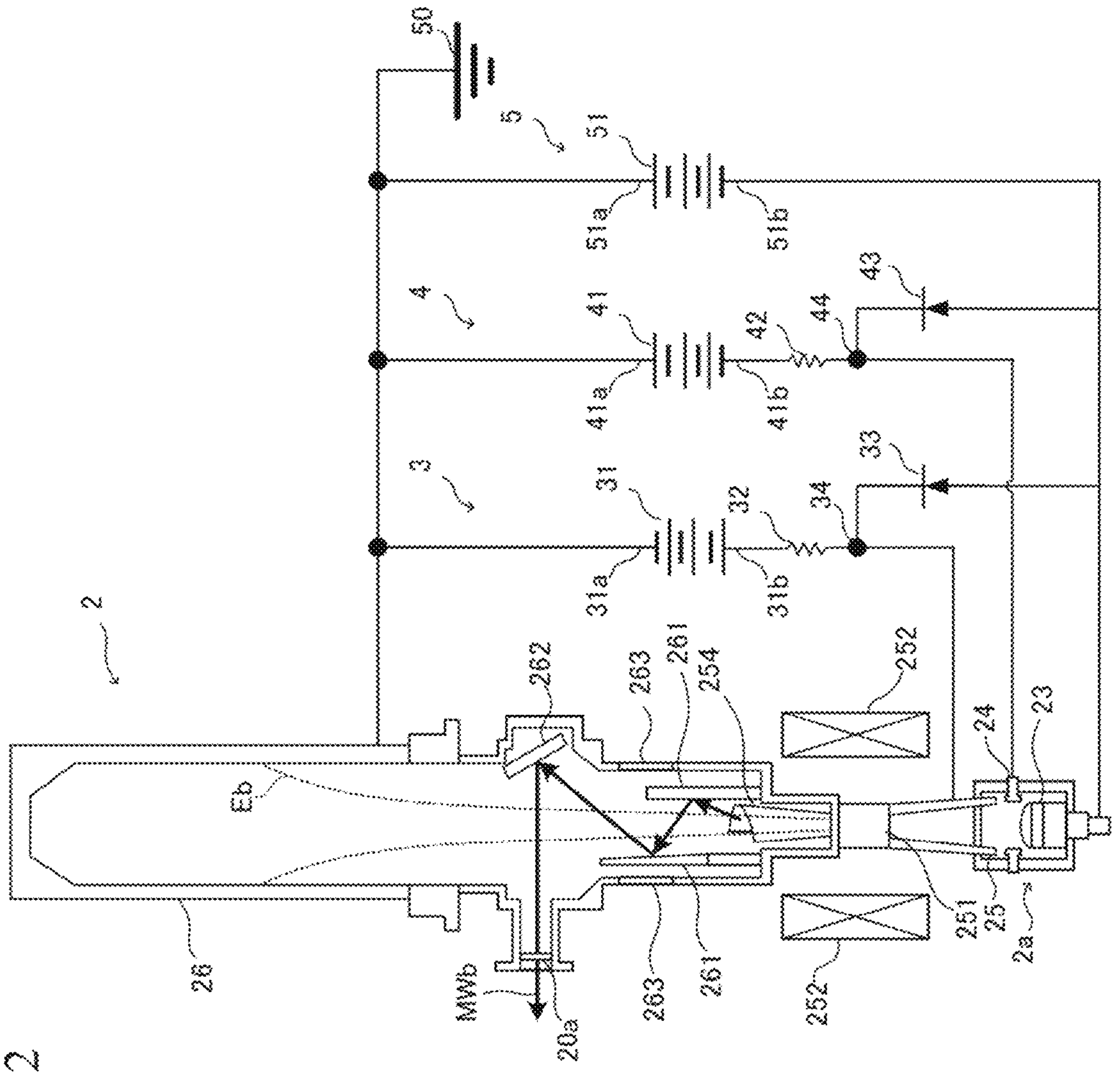
FIG. 2 is a circuit diagram illustrating a configuration of a power supply device (triode type) for a gyrotron according to a second embodiment.

Next, a second embodiment of the present invention will be described. FIG. 2 illustrates a schematic configuration of a power supply device for a gyrotron according to the second embodiment. In the present embodiment, a power supply stabilization circuit and a power supply resistor are added on the anode voltage circuit 4 to the configuration of the first embodiment described above. Note that, in the present embodiment, the same components as those of the first embodiment described above are denoted by the same reference numerals, and functions and the like thereof are the same unless otherwise specified, and the description thereof will be omitted.

(Configuration of Power Supply Device for Gyrotron)

The gyrotron 2 according to the present embodiment described above includes a power control device 1 for a gyrotron as illustrated in FIG. 1. As described above, the gyrotron 2 according to the present embodiment is roughly configured by the triode electron gun unit 2*a* including the cathode electrode and the anode electrode 24, the body unit 25 including the cavity resonator 251, and the collector unit 26.

The power control device 1 for a gyrotron includes a main voltage circuit 5, a body voltage circuit 3, and an anode voltage circuit 4 as circuits of a power supply system connected to the gyrotron 2 to be loaded. The main voltage circuit 5 is a main power supply circuit that applies a voltage to the electron gun unit 2*a* and the collector unit 26, and is powered by the main power supply 51.

The anode voltage circuit 4 is a power supply circuit that applies a voltage between the anode electrode 24 and the collector unit 26, here, is powered by an anode power supply 41, and applies a voltage to the anode electrode 24 with the collector unit 26 as a reference potential (0 V).

The body voltage circuit 3 is a power supply circuit that applies a voltage between the body unit 25 and the collector unit 26, and is a power supply circuit that applies a voltage to the body unit 25 with the collector unit 26 as a reference potential, here, is powered by the body power supply 31, and applies a voltage to the body unit 25 with the collector unit 26 as a reference potential (0 V). Note that collector side supply lines 31*a*, 41*a*, and 51*a* of the power supplies 31,41, and 51 are connected to a ground 50, and the collector unit 26 is set to have a reference potential (0 V).

A body power supply stabilization circuit 33 maintaining an input/output voltage varying between the electron gun side supply line 51*b* of the main power supply 51 in the main voltage circuit 5 and a body side supply line 31*b* of the body power supply 31 in the body voltage circuit 3 at a predetermined output voltage is disposed. A body power supply resistor 32 connected between the body power supply 31 and a connection point 34 between the body power supply stabilization circuit 33 and the body side supply line 31*b* is disposed.

In the present embodiment, the body power supply stabilization circuit 33 can be, for example, a linear regulator circuit such as a series regulator or a shunt regulator that adjusts an input voltage to a predetermined output voltage by a voltage drop of a control element such as a bipolar transistor or a MOSFET. This power supply stabilization circuit may include, for example, a low-loss constant voltage control circuit that linearly adjusts an input voltage to a predetermined output voltage by a variable resistor whose resistance value is adjusted according to a feedback voltage of an output voltage, such as a linear regulator circuit including a Zener diode and a transistor. Note that this linear regulator circuit may be used singly, or can be used as a stack in which a plurality of linear regulator circuits are arranged, and when the linear regulator circuit is set to, for example, 80 kV, a current flows from the linear regulator circuit of the body power supply stabilization circuit 33 to the body power supply resistor 32 when the main power supply 51 exceeds 50 kV.

An anode power supply stabilization circuit 43 maintaining an input/output voltage varying between the electron gun side supply line 51*b* of the main power supply 51 in the main voltage circuit 5 and an anode side supply line 41*b* of the anode power supply 41 in the anode voltage circuit 4 at a predetermined output voltage is provided. An anode power supply resistor 42 connected between the anode power supply 41 and a connection point 44 between the anode power supply stabilization circuit 43 and the anode side supply line 41*b* is disposed.

In the present embodiment, the anode power supply stabilization circuit 43 includes, for example, a linear regulator circuit such as a series regulator or a shunt regulator that adjusts an input voltage to a predetermined output voltage by a voltage drop of a control element such as a bipolar transistor or a MOSFET. More specifically, as illustrate in FIG. 2, the anode power supply resistor 42 is inserted in the anode voltage circuit 4, and a regulator circuit such as a series regulator or a shunt regulator is inserted between the anode power supply stabilization circuit 43 and the electron gun side supply line 51*b* of the main voltage circuit 5. When the linear regulator circuit is set to, for example, 40 kV, a current flows from the linear regulator circuit of the anode power supply stabilization circuit 43 to the anode power supply resistor 42 when the main power supply 51 exceeds 50 kV.

(Operation and Effect)

According to the power supply device and control method for a gyrotron according to the present embodiment described above, the body power supply stabilization circuit 33 is disposed between the electron gun side supply line 51*b* of the main power supply 51 and the body side supply line 31*b* of the body power supply 31, and the body power supply resistor 32 is disposed between the body power supply 31 and the connection point 44 between the body power supply stabilization circuit 33 and the body side supply line 31*b*. In the present embodiment, the anode power supply stabilization circuit 43 is disposed between the electron gun side supply line 51*b* of the main power supply 51 and the anode side supply line 41*b* of the anode power supply 41, and the anode power supply resistor 42 is disposed between the anode power supply 41 and the connection point 44 between the anode power supply stabilization circuit 43 and the anode side supply line 41*b*.

Thereby, when the voltage difference between the electron gun side supply line 51*b* of the main power supply 51 and the body side supply line 31*b* of the body power supply 31 is small or an overvoltage is applied, a predetermined output can be maintained. When the voltage difference between the electron gun side supply line 51*b* of the main power supply 51 and the anode side supply line 41*b* of the anode power supply 41 is small or an overvoltage is applied, a predetermined output can be maintained.

The input/output voltage varying between the electron gun side supply line 51*b* and the body side supply line 31*b* or the anode side supply line 41*b* can be maintained at a predetermined output voltage. In particular, since the body power supply stabilization circuit 33 and the anode power supply stabilization circuit 43 according to the present embodiment include, for example, a linear regulator circuit such as a series regulator or a shunt regulator that adjusts an input voltage to a predetermined output voltage by a voltage drop of a control element such as a bipolar transistor or a MOSFET, when the main power supply 51 exceeds a predetermined voltage, a current flows from the body power supply stabilization circuit 33 to the body power supply resistor 32, the beam voltage is kept constant, and extremely stable high-efficiency oscillation can be expected.

Although the electron beam spirally advances the magnetic field, since the pitch factor of the rotation is determined by the anode and cathode tube voltages, the anode power supply stabilization circuit 43 also keeps the beam voltage constant, so that the pitch factor of the electron beam, which is important for oscillation, can be extremely stabilized, and high-efficiency oscillation can be expected.

At this time, the voltage variation of the main power supply 51 can be absorbed by the flow voltage generated in the anode power supply resistor 42, and the energy recovery voltage is reduced by this voltage, but since the oscillation efficiency is greatly improved, a great improvement in the overall efficiency can be expected. Note that a user-friendly power supply system can be constructed by making the setting voltage of the linear regulator circuit remote.

As a result, according to the present embodiment, in a gyrotron, it is possible to further stabilize a voltage applied to a power supply accelerating an electron beam and a power supply necessary for oscillation while suppressing manufacturing cost and operation cost of a facility, and to improve the oscillation efficiency of the gyrotron. As a result of improving the oscillation efficiency, downsizing of the collector and downsizing of the power supply and the cooling system can be promoted.

[Modification]

Although the embodiments of the present invention have been described above, these embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

Figure 3:
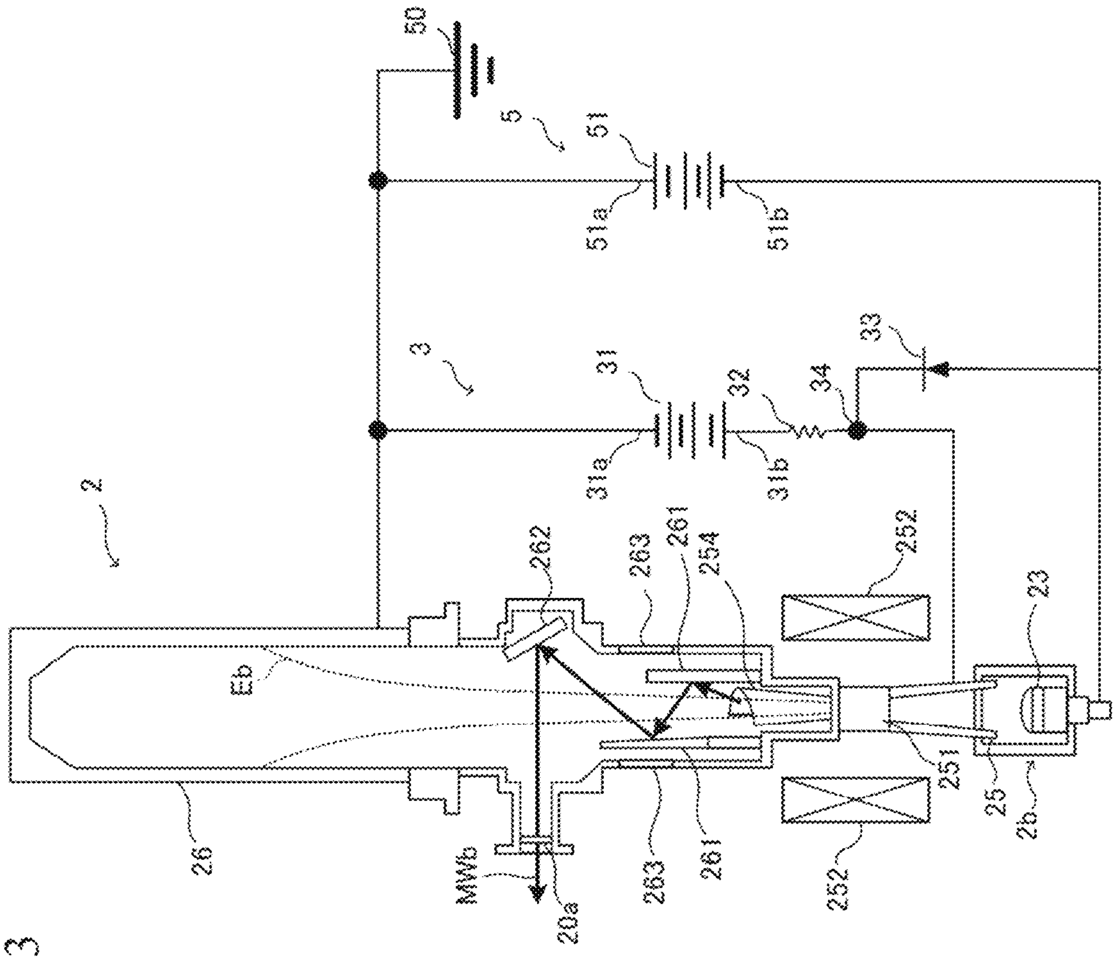
FIG. 3 is a circuit diagram illustrating a configuration of a power supply device (diode type) for a gyrotron according to a modification.

For example, in the first embodiment and the second embodiment described above, a case where the electron gun unit 2*a* is a triode type having the anode electrode 24 has been described as an example, but the present invention is not limited thereto, and can also be applied to a gyrotron including a diode type electron gun unit 2*b* in which the anode electrode 24 is omitted as illustrated in FIG. 3. In such a diode type electron gun unit 2*b*, since the anode electrode 24 as described is not provided, a circuit related to the anode electrode 24 is omitted.

In the power control device 1 for a gyrotron illustrated in FIG. 1 or FIG. 2, only the main voltage circuit 5 and the body voltage circuit 3 are provided, the anode voltage circuit 4 is omitted, and a circuit configuration related to the anode voltage circuit 4 is also omitted. As in the above-described embodiment, between the main voltage circuit 5 and the body voltage circuit 3, the body power supply stabilization circuit 33 is disposed between the electron gun side supply line 51*b* and the body side supply line 31*b*, and the body power supply resistor 32 is disposed between the connection point 34 and the body power supply 31.

Also in the present modification, the body power supply stabilization circuit 33 can include, for example, a linear regulator circuit such as a series regulator or a shunt regulator that adjusts an input voltage to a predetermined output voltage by a voltage drop of a control element such as a bipolar transistor or a MOSFET. This power supply stabilization circuit may include, for example, a low-loss constant voltage control circuit that linearly adjusts an input voltage to a predetermined output voltage by a variable resistor whose resistance value is adjusted according to a feedback voltage of an output voltage, such as a linear regulator circuit including a Zener diode and a transistor. Note that this linear regulator circuit may be used singly, or can be used as a stack in which a plurality of linear regulator circuits are arranged. In this case, the body power supply resistor 32 is inserted into the body voltage circuit 3, and the body power supply stabilization circuit 33 including a linear regulator circuit as a low-loss constant voltage control circuit is inserted between the body voltage circuit 3 and the electron gun side supply line 51*b* of the main voltage circuit 5.

According to the present modification as described above, even in a gyrotron including a diode type electron gun unit in which the anode electrode is omitted, it is possible to further stabilize a voltage applied to a power supply accelerating an electron beam and a power supply necessary for oscillation while suppressing manufacturing cost and operation cost of a facility, and to improve the oscillation efficiency of the gyrotron.

REFERENCE SIGNS LIST

Eb Electron beam
MWb Quasi-optical electromagnetic beam
1 Power control device for gyrotron
2 Gyrotron
2*a*, 2*b* Electron gun unit
3 Body voltage circuit
4 Anode voltage circuit
5 Main voltage circuit
20*a* Output window
21 Heater power supply
22 Heater transformer
23 Cathode electrode
24 Anode electrode
25 Body unit
26 Collector unit
31 Body power supply
31*a*, 41*a*, 51*a* Collector side supply line
31*b* Body side supply line
32 Body power supply resistor
33 Body power supply stabilization circuit
41 Anode power supply
41*b* Anode side supply line
42 Anode power supply resistor
43 Anode power supply stabilization circuit
50 Ground
51 Main power supply
51*b* Electron gun side supply line
241, 242 Reflection mirror
243 Insulating ceramic
251 Cavity resonator
252 Solenoid coil
254 Mode converter
261 Mirror

The invention claimed is:

1. A power control device for a gyrotron, the gyrotron including:

an electron gun unit generating an electron beam;

a body unit including a cavity resonator oscillating a high power radio frequency by an interaction with the electron beam generated by the electron gun unit; and a collector unit capturing the electron beam after the interaction, the power control device comprising:

a main power supply supplying power to a main voltage circuit applying a voltage to the electron gun unit and the collector unit;

a body power supply supplying power to a body voltage circuit applying a voltage between the body unit and the collector unit;

a body power supply stabilization circuit maintaining an input/output voltage varying between an electron gun side supply line of the main power supply in the main voltage circuit and a body side supply line of the body power supply in the body voltage circuit at a predetermined output voltage; and a body power supply resistance means connected between the body power supply and a connection point between the body power supply stabilization circuit and the body side supply line.

2. The power control device for a gyrotron according to claim 1, wherein the body power supply stabilization circuit includes a linear regulator circuit adjusting an input voltage to a predetermined output voltage by a voltage drop of a control element.

3. The power control device for a gyrotron according to claim 1, further comprising:

an anode power supply supplying power to an anode voltage circuit applying a voltage between an anode electrode constituting the electron gun unit and the collector unit;

an anode power supply stabilization circuit maintaining an input/output voltage varying between the electron gun side supply line of the main power supply in the main voltage circuit and the anode side supply line of the body power supply in the anode voltage circuit at a predetermined output voltage; and an anode power supply resistance means connected between the anode power supply and a connection point between the anode power supply stabilization circuit and the anode side supply line.

4. The power control device for a gyrotron according to claim 3, wherein the anode power supply stabilization circuit includes a linear regulator circuit adjusting an input voltage to a predetermined output voltage by a voltage drop of a control element.

5. A power control method for a gyrotron, the gyrotron including:

an electron gun unit generating an electron beam;

a body unit including a cavity resonator oscillating a high power radio frequency by an interaction with the electron beam generated by the electron gun unit; and a collector unit capturing the electron beam after the interaction, the power control method controlling a voltage relating to each unit in the gyrotron, the power control method comprising:

a power supplying step of supplying, by a main power supply, power to a main voltage circuit applying a voltage to the electron gun unit and the collector unit and supplying, by a body power supply, power to a body voltage circuit applying a voltage between the body unit and the collector unit;

a power supply stabilizing step of maintaining, by a body power supply stabilization circuit, an input/output voltage varying between an electron gun side supply line of the main power supply in the main voltage circuit and a body side supply line of the body power supply in the body voltage circuit at a predetermined output voltage; and a power supply rectifying step of adjusting, by a body power supply resistance means, a voltage between the body power supply and a connection point between the body power supply stabilization circuit and the body side supply line.

6. The power control method for a gyrotron according to claim 5, wherein the body power supply stabilization circuit includes a linear regulator circuit adjusting an input voltage to a predetermined output voltage by a voltage drop of a control element.

7. The power control method for a gyrotron according to claim 6, wherein in the power supplying step, an anode power supply further supplies power to an anode voltage circuit applying a voltage between an anode electrode constituting the electron gun unit and the collector unit, in the power supply stabilizing step, an anode power supply stabilization circuit further maintains an input/output voltage varying between the electron gun side supply line of the main power supply in the main voltage circuit and the anode side supply line of the body power supply in the anode voltage circuit at a predetermined output voltage, and in the power supply rectifying step, an anode power supply resistance means adjusts a voltage between the anode power supply and a connection point between the anode power supply stabilization circuit and the anode side supply line.

8. The power control method for a gyrotron according to claim 7, wherein the anode power supply stabilization circuit includes a linear regulator circuit adjusting an input voltage to a predetermined output voltage by a voltage drop of a control element.

* * * * *